(12) United States Patent
Whinnett et al.

(10) Patent No.: US 8,798,630 B2
(45) Date of Patent: Aug. 5, 2014

(54) FEMTOCELL BASE STATION

(75) Inventors: Nick Whinnett, Barnfield (GB); Fiona Somerville, Bristol (GB); Christopher Smart, Wootton Bassett (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/439,181

(22) Filed: Apr. 4, 2012

(65) Prior Publication Data

US 2012/0258718 A1    Oct. 11, 2012

Related U.S. Application Data

(63) Continuation of application No. PCT/EP2010/064794, filed on Oct. 5, 2010.

(30) Foreign Application Priority Data

Oct. 5, 2009  (GB) .................................. 0917370.9

(51) Int. Cl.
*H04W 36/00*  (2009.01)

(52) U.S. Cl.
USPC ........... 455/437; 455/517; 455/522; 455/436; 455/561; 455/456.1

(58) Field of Classification Search
USPC ........................ 455/517, 522, 436, 561, 456.1
See application file for complete search history.

(56) References Cited

U.S. PATENT DOCUMENTS

| | | | |
|---|---|---|---|
| 4,380,046 A | 4/1983 | Frosch et al. | |
| 4,574,345 A | 3/1986 | Konesky | |
| 4,589,066 A | 5/1986 | Lam et al. | |
| 4,601,031 A | 7/1986 | Walker et al. | |
| 4,603,404 A | 7/1986 | Yamauchi et al. | |
| 4,622,632 A | 11/1986 | Tanimoto et al. | |
| 4,698,746 A | 10/1987 | Goldstein | |
| 4,720,780 A | 1/1988 | Dolecek | |
| 4,736,291 A | 4/1988 | Jennings et al. | |
| 4,814,970 A | 3/1989 | Barbagelata et al. | |
| 4,825,359 A | 4/1989 | Ohkami et al. | |
| 4,858,233 A | 8/1989 | Dyson et al. | |

(Continued)

FOREIGN PATENT DOCUMENTS

| CN | 101754351 | 6/2010 |
|---|---|---|
| CN | 101873688 | 10/2010 |

(Continued)

OTHER PUBLICATIONS

Panesar, G. et al., "Deterministic Parallel Processing", Proceedings of the 1st Microgrid Workshop, Jul. 2005.

(Continued)

*Primary Examiner* — Charles Shedrick
(74) *Attorney, Agent, or Firm* — Schiff Hardin LLP

(57) ABSTRACT

There is provided a method of operating a femtocell base station comprising, following a hand-in or reselection of the femtocell base station by a mobile device, determining a reason for the hand-in or reselection by the mobile device and adjusting a maximum permitted transmission power of the femtocell base station according to the determined reason. A femtocell base station for use in a communication network is also provided that comprises a processor configured to perform the above method following hand-in or reselection of the femtocell base station.

18 Claims, 6 Drawing Sheets

(56) References Cited

U.S. PATENT DOCUMENTS

| | | |
|---|---|---|
| 4,890,279 A | 12/1989 | Lubarsky |
| 4,914,653 A | 4/1990 | Bishop et al. |
| 4,937,741 A | 6/1990 | Harper et al. |
| 4,943,912 A | 7/1990 | Aoyama et al. |
| 4,967,326 A | 10/1990 | May |
| 4,974,146 A | 11/1990 | Works et al. |
| 4,974,190 A | 11/1990 | Curtis |
| 4,992,933 A | 2/1991 | Taylor |
| 5,036,453 A | 7/1991 | Renner et al. |
| 5,038,386 A | 8/1991 | Li |
| 5,065,308 A | 11/1991 | Evans |
| 5,109,329 A | 4/1992 | Strelioff |
| 5,152,000 A | 9/1992 | Hillis |
| 5,193,175 A | 3/1993 | Cutts et al. |
| 5,233,615 A | 8/1993 | Goetz |
| 5,239,641 A | 8/1993 | Horst |
| 5,241,491 A | 8/1993 | Carlstedt |
| 5,247,694 A | 9/1993 | Dahl |
| 5,253,308 A | 10/1993 | Johnson |
| 5,265,207 A | 11/1993 | Zak et al. |
| 5,280,584 A | 1/1994 | Caesar et al. |
| 5,384,697 A | 1/1995 | Pascucci |
| 5,386,495 A | 1/1995 | Wong et al. |
| 5,408,676 A | 4/1995 | Mori |
| 5,410,723 A | 4/1995 | Schmidt et al. |
| 5,410,727 A | 4/1995 | Jaffe et al. |
| 5,473,731 A | 12/1995 | Seligson |
| 5,555,548 A | 9/1996 | Iwai et al. |
| 5,557,751 A | 9/1996 | Banman et al. |
| 5,570,045 A | 10/1996 | Erdal et al. |
| 5,600,784 A | 2/1997 | Bissett et al. |
| 5,692,139 A | 11/1997 | Slavenburg |
| 5,719,445 A | 2/1998 | McClure |
| 5,734,921 A | 3/1998 | Dapp et al. |
| 5,752,067 A | 5/1998 | Wilkinson et al. |
| 5,761,514 A | 6/1998 | Aizikowitz et al. |
| 5,790,879 A | 8/1998 | Wu |
| 5,795,797 A | 8/1998 | Chester et al. |
| 5,796,937 A | 8/1998 | Kizuka |
| 5,802,561 A | 9/1998 | Fava et al. |
| 5,805,839 A | 9/1998 | Singahl |
| 5,826,033 A | 10/1998 | Hayashi et al. |
| 5,826,049 A | 10/1998 | Ogata et al. |
| 5,826,054 A | 10/1998 | Jacobs et al. |
| 5,845,060 A | 12/1998 | Vrba et al. |
| 5,860,008 A | 1/1999 | Bradley |
| 5,861,761 A | 1/1999 | Kean |
| 5,864,706 A | 1/1999 | Kurokawa et al. |
| 5,923,615 A | 7/1999 | Leach et al. |
| 5,926,640 A | 7/1999 | Mason et al. |
| 5,946,484 A | 8/1999 | Brandes |
| 5,951,664 A | 9/1999 | Lambrecht et al. |
| 5,959,995 A | 9/1999 | Wicki et al. |
| 5,963,609 A | 10/1999 | Huang |
| 6,023,757 A | 2/2000 | Nishimoto et al. |
| 6,044,451 A | 3/2000 | Slavenburg et al. |
| 6,052,752 A | 4/2000 | Kwon |
| 6,055,285 A | 4/2000 | Alston |
| 6,069,490 A | 5/2000 | Ochotta et al. |
| 6,101,599 A | 8/2000 | Wright et al. |
| 6,122,677 A | 9/2000 | Porterfield |
| 6,167,502 A | 12/2000 | Pechanek et al. |
| 6,173,386 B1 | 1/2001 | Key et al. |
| 6,175,665 B1 | 1/2001 | Sawada |
| 6,199,093 B1 | 3/2001 | Yokoya |
| 6,317,820 B1 | 11/2001 | Shiell et al. |
| 6,345,046 B1 | 2/2002 | Tanaka |
| 6,360,259 B1 | 3/2002 | Bradley |
| 6,381,293 B1 | 4/2002 | Lee et al. |
| 6,381,461 B1 | 4/2002 | Besson et al. |
| 6,393,026 B1 | 5/2002 | Irwin |
| 6,408,402 B1 | 6/2002 | Norman |
| 6,424,870 B1 | 7/2002 | Maeda et al. |
| 6,448,910 B1 | 9/2002 | Lu |
| 6,499,096 B1 | 12/2002 | Suzuki |
| 6,499,097 B2 | 12/2002 | Tremblay et al. |
| 6,567,417 B2 | 5/2003 | Kalkunte et al. |
| 6,615,339 B1 | 9/2003 | Ito et al. |
| 6,631,439 B2 | 10/2003 | Saulsbury et al. |
| 6,681,341 B1 | 1/2004 | Fredenburg et al. |
| 6,775,766 B2 | 8/2004 | Revilla et al. |
| 6,795,422 B2 | 9/2004 | Ohsuge |
| 6,829,296 B1 | 12/2004 | Troulis et al. |
| 6,892,293 B2 | 5/2005 | Sachs et al. |
| 6,928,500 B1 | 8/2005 | Ramanujan et al. |
| 6,952,181 B2 | 10/2005 | Karr et al. |
| 6,961,782 B1 | 11/2005 | Denneau et al. |
| 6,996,157 B2 | 2/2006 | Ohsuge |
| 7,103,008 B2 | 9/2006 | Greenblat et al. |
| 7,161,978 B2 | 1/2007 | Lu et al. |
| 7,237,055 B1 | 6/2007 | Rupp |
| 7,302,552 B2 | 11/2007 | Guffens et al. |
| 7,340,017 B1 | 3/2008 | Banerjee |
| 7,342,414 B2 | 3/2008 | DeHon |
| 7,383,422 B2 | 6/2008 | Kageyama et al. |
| 7,428,721 B2 | 9/2008 | Rohe et al. |
| 7,549,081 B2 | 6/2009 | Robbins et al. |
| 7,672,836 B2 | 3/2010 | Lee et al. |
| 7,712,067 B1 | 5/2010 | Fung et al. |
| 7,801,029 B2 | 9/2010 | Wrenn et al. |
| 7,804,719 B1 | 9/2010 | Chirania et al. |
| 8,032,142 B2 | 10/2011 | Carter et al. |
| 2002/0028690 A1* | 3/2002 | McKenna et al. ............ 455/517 |
| 2002/0045433 A1 | 4/2002 | Vihiriala |
| 2002/0069345 A1 | 6/2002 | Mohamed et al. |
| 2002/0174318 A1 | 11/2002 | Stuttard et al. |
| 2002/0198606 A1 | 12/2002 | Satou |
| 2003/0154358 A1 | 8/2003 | Seong |
| 2003/0235241 A1 | 12/2003 | Tamura |
| 2004/0078548 A1 | 4/2004 | Claydon et al. |
| 2004/0083409 A1 | 4/2004 | Rozenblit et al. |
| 2004/0139466 A1 | 7/2004 | Sharma et al. |
| 2004/0150422 A1 | 8/2004 | Wong et al. |
| 2004/0198386 A1 | 10/2004 | Dupray |
| 2005/0083840 A1 | 4/2005 | Wilson |
| 2005/0114565 A1 | 5/2005 | Gonzalez et al. |
| 2005/0124344 A1 | 6/2005 | Laroia et al. |
| 2005/0163248 A1 | 7/2005 | Berangi et al. |
| 2005/0250502 A1 | 11/2005 | Laroia et al. |
| 2005/0282500 A1 | 12/2005 | Wang et al. |
| 2006/0087323 A1 | 4/2006 | Furse et al. |
| 2006/0089154 A1 | 4/2006 | Laroia et al. |
| 2006/0251046 A1 | 11/2006 | Fujiwara |
| 2006/0268962 A1 | 11/2006 | Cairns et al. |
| 2007/0036251 A1 | 2/2007 | Jelonnek et al. |
| 2007/0127556 A1 | 6/2007 | Sato |
| 2007/0173255 A1 | 7/2007 | Tebbit et al. |
| 2007/0183427 A1 | 8/2007 | Nylander et al. |
| 2007/0220522 A1 | 9/2007 | Coene et al. |
| 2007/0220586 A1 | 9/2007 | Salazar |
| 2007/0248191 A1 | 10/2007 | Pettersson |
| 2007/0254620 A1 | 11/2007 | Lindqvist et al. |
| 2007/0263544 A1 | 11/2007 | Yamanaka et al. |
| 2007/0270151 A1 | 11/2007 | Claussen et al. |
| 2008/0146154 A1 | 6/2008 | Claussen et al. |
| 2008/0151832 A1 | 6/2008 | Iwasaki |
| 2009/0003263 A1 | 1/2009 | Foster et al. |
| 2009/0042593 A1 | 2/2009 | Yavuz et al. |
| 2009/0042596 A1* | 2/2009 | Yavuz et al. ............ 455/522 |
| 2009/0046665 A1 | 2/2009 | Robson et al. |
| 2009/0080550 A1 | 3/2009 | Kushioka |
| 2009/0092122 A1 | 4/2009 | Czaja et al. |
| 2009/0097452 A1 | 4/2009 | Gogic |
| 2009/0098871 A1 | 4/2009 | Gogic |
| 2009/0111503 A1 | 4/2009 | Pedersen et al. |
| 2009/0150420 A1 | 6/2009 | Towner |
| 2009/0163216 A1 | 6/2009 | Hoang et al. |
| 2009/0168907 A1 | 7/2009 | Mohanty et al. |
| 2009/0196253 A1 | 8/2009 | Semper |
| 2009/0215390 A1 | 8/2009 | Ku et al. |
| 2009/0252200 A1 | 10/2009 | Dohler et al. |
| 2009/0264077 A1 | 10/2009 | Damnjanovic |
| 2009/0296635 A1 | 12/2009 | Hui et al. |
| 2010/0035556 A1 | 2/2010 | Cai et al. |

(56) References Cited

U.S. PATENT DOCUMENTS

| | | | |
|---|---|---|---|
| 2010/0046455 A1 | 2/2010 | Wentink et al. | |
| 2010/0054237 A1 | 3/2010 | Han et al. | |
| 2010/0087148 A1 | 4/2010 | Srinivasan et al. | |
| 2010/0105345 A1 | 4/2010 | Thampi et al. | |
| 2010/0111070 A1 | 5/2010 | Hsu | |
| 2010/0113027 A1* | 5/2010 | Hsu | 455/436 |
| 2010/0157906 A1 | 6/2010 | Yang et al. | |
| 2010/0159991 A1* | 6/2010 | Fu et al. | 455/561 |
| 2010/0195525 A1 | 8/2010 | Eerolainen | |
| 2010/0215032 A1 | 8/2010 | Jalloul et al. | |
| 2010/0216403 A1 | 8/2010 | Harrang | |
| 2010/0216485 A1 | 8/2010 | Hoole | |
| 2010/0222068 A1 | 9/2010 | Gaal et al. | |
| 2010/0234061 A1 | 9/2010 | Khandekar et al. | |
| 2010/0248646 A1 | 9/2010 | Yamazaki et al. | |
| 2010/0273481 A1 | 10/2010 | Meshkati et al. | |
| 2010/0273504 A1* | 10/2010 | Bull et al. | 455/456.1 |
| 2010/0279689 A1 | 11/2010 | Tinnakornsrisuphap et al. | |
| 2011/0002426 A1 | 1/2011 | Muirhead | |
| 2011/0053599 A1* | 3/2011 | Hsu et al. | 455/436 |
| 2011/0122834 A1 | 5/2011 | Walker et al. | |
| 2011/0130143 A1 | 6/2011 | Mori et al. | |
| 2011/0170494 A1 | 7/2011 | Kim et al. | |

FOREIGN PATENT DOCUMENTS

| | | |
|---|---|---|
| EP | 0 180 212 A3 | 5/1986 |
| EP | 492174 A3 | 7/1992 |
| EP | 0 877 533 A3 | 11/1998 |
| EP | 0 973 099 | 1/2000 |
| EP | 0 977 355 | 2/2000 |
| EP | 1054523 | 11/2000 |
| EP | 1 134 908 | 9/2001 |
| EP | 1418776 | 5/2004 |
| EP | 1 946 506 | 7/2008 |
| EP | 1876854 | 9/2008 |
| EP | 2 071 738 | 6/2009 |
| EP | 2 326 118 | 5/2011 |
| GB | 2 304 495 | 3/1997 |
| GB | 2 370 380 | 6/2002 |
| GB | 2398651 | 8/2004 |
| GB | 2 414 896 | 12/2005 |
| GB | 2391083 | 3/2006 |
| GB | 2 447 439 | 9/2008 |
| GB | 2463074 | 3/2010 |
| JP | 61123968 | 6/1986 |
| JP | A-8-297652 | 11/1996 |
| JP | 11272645 | 10/1999 |
| JP | 2001-034471 | 2/2001 |
| JP | 2004-525439 | 8/2004 |
| JP | 2006-500673 | 1/2006 |
| WO | 90/04235 | 4/1990 |
| WO | 91/11770 | 8/1991 |
| WO | 97/26593 | 7/1997 |
| WO | 98/50854 | 11/1998 |
| WO | 01/02960 | 1/2001 |
| WO | 02/50624 | 6/2002 |
| WO | 02/50700 | 6/2002 |
| WO | 03/001697 | 1/2003 |
| WO | 2004/029796 A3 | 4/2004 |
| WO | 2004/034251 | 4/2004 |
| WO | 2004/102989 | 11/2004 |
| WO | 2005/048491 | 5/2005 |
| WO | 2006/059172 | 6/2006 |
| WO | 2007/021139 | 2/2007 |
| WO | 2007/054127 | 5/2007 |
| WO | 2007/056733 | 5/2007 |
| WO | 2007/126351 | 11/2007 |
| WO | 2008/030934 | 3/2008 |
| WO | 2008/090154 | 7/2008 |
| WO | 2008/099340 | 8/2008 |
| WO | 2008/155732 | 12/2008 |
| WO | 2009/054205 | 4/2009 |
| WO | 2010/072127 | 7/2010 |
| WO | 2010/126155 | 11/2010 |

OTHER PUBLICATIONS

Towner, D. et al., "Debugging and Verification of Parallel Systems—the picoChip way", 2004.

picoChip, "PC7203 Development Platform Preliminary Product Brief", Jul. 2007.

Ennals, R. et al., "Task Partitioning for Multi-core Network Processors", 2005.

Rabideau, Daniel J., et al., "Simulated Annealing for Mapping DSP Algorithms on to Multiprocessors," Signals, Systems and Computers, 1993 Conference Record of the Twenty-Seventh Asilomar Conference, Nov. 1-3, 1993, IEEE, pp. 668-672.

Nanda, Ashwini K., et al., "Mapping Applications onto a Cache Coherent Multiprocessor," Conference on High Performance Networking and Computing, Proceedings of the 1992 ACM/IEEE Conference on Supercomputing, 1992, IEEE, pp. 368-377.

Lin, Lian-Yu, et al., Communication-driven Task Binding for Multiprocessor with Latency Insensitive Network-on-Chip, Design Automation Conference, 2005 Proceedings of th ASP-DAC, Jan. 18/21, 2005, IEEE, pp. 39-44.

Holger Claussen, Bell Laboratories, Alcatel-Lucent; "Performance of Macro and Co-Channel Femtocells in a Hierarchical Cell Structure"; The 18th Annual IEEE Internation Symposium on Personal, Indoor and Mobile Radio Communications (PIMRC'07); Sep. 1, 2007; pp. 1-5, XP031168593, ISBN: 978-1-4244-1143-6; Swindon, United Kingdom.

Shiroshita, T., et al.: "Reliable data distribution middleware for large-scale massive data replication" Parallel and Distributed Information Systems, 1993, Fourth International Conference on Miami Beach, FL, USA Dec. 18-20, 1996, Los Alamitos, CA, USA IEEE Comput. Soc, US, Dec. 18, 1996, pp. 196-205m XP010213188 ISBN: 0-8186-7475-X.

Levine B. N. et al.: "A comparison of known classes of reliable multicast protocols" Netowrk Protocols, 1996 International Conference on Columbus, OH, USA Oct. 29-Nov. 1, 1996, Los Alamitos, CA, USA IEEE Comput. Soc. US Oct. 29, 1996, pp. 112-121, XP010204425 ISBN: 0-8186-7453-9.

Ishijima, et al., A Semi-Synchronous Circuit Design Method by Clock Tree Modification IEEE Trans. Fundamentals, vol. E85-A, no. Dec. 12, 2002.

Greenstreet, et al., Implementing a STARI Chip, IEEE 1995.

Hierarchical multiprocessor organizations; J. Archer Harris; David R. Smith; International Symposium on computer Architecture; Proceedings of the 4th annual symposium on Computer architecture pp. 41-48 Year of Publication 1977.

"Hierarchical Interconnection Networks for Multicomputer systems" Sivarama P. Dandamudi, et al. IEEE Transactions on Computers archive vol. 39, Issue 6 (Jun. 1990 ) pp. 786-797 Year of Publication: 1990.

A Cluster Structure as an Interconnection Network for Large Multimicrocomputer Systems Wu, S.B. Liu, M.T. This paper appears in: Transactions on Computers Publication Date: Apr. 1981 vol. C-30, Issue: 4 on pp. 254-264.

Performance Analysis of Multilevel Bus Networks for Hierarchichal Multiprocessors S.M. Mahmud IEEE Transactions on Computers archive vol. 43, Issue 7 (Jul. 1994) pp. 789-805 Year of Publication: 1994.

Performance Analysis of a Generalized Class of M-Level Hierarchical Multiprocessor Systems I.O. Mahgoub A.K. Elmagarmid Mar. 1992 (vol. 3, No. 2) pp. 129-138.

Kober, Rudolf, "The Multiprocessor System SMS 201—Combining 128 Microprocessors to a Powerful Computer," Sep. 1977, Compcon '77, pp. 225-230.

Knight, Thomas and Wu, Henry, "A Method for Skew-free Distribution of Digital Signals using Matched Variable Delay Lines," VLSI Circuits, 1993. Digest of Technical Papers. 1993 Symposium on, May 1993, pp. 19-21.

(56) References Cited

OTHER PUBLICATIONS

Popli, S.P., et al., "A Reconfigurable VLSI Array for Reliability and Yield Enhancement," Proceedings of the International Conference on Systolic Arrays, 1988, pp. 631-642.

John, L.K., et al., "A Dynamically Reconfigurable Interconnect for Array Processors," IEE Transactions on Very Large Scale Integration (lvsi) Systems, vol. 6, No. 1, Mar. 1998, pp. 150-157.

Schmidt, U., et al., "Datawave: A Single-Chip Multiprocessor for Video Applications," IEEE Micro, vol. 11, No. 3, Jun. 1991, pp. 22-25, 88-94.

Chean, M., et al., "A Taxonomy of Reconfiguration Techniques for Fault-Tolerant Processor Arrays," Computer, IEEE Computer Society, vol. 23, No. 1, Jan. 1990, pp. 55-69.

Kamiura, N., et al., "A Repairable and Diagnosable Cellular Array on Multiple-Valued Logic," Proceedings of the 23rd International Symposium on Multiple-Valued Logic, 1993, pp. 92-97.

LaForge, l., "Extremally Fault Tolerant Arrays," Proceedings: International Conference on Wafer Scale Integration, 1989, pp. 365-378.

Reiner Hartenstein, et al., On Reconfigurable Co-Processing Units, Proceedings of Reconfigurable Architectures Workshop (RAW98), Mar. 30, 1998.

Schmidt, U., et al., "Data-Driven Array Processor for Video Signal Processing", IEEE—1990 (USA).

Muhammad Ali Mazidi, "The80x86 IBM PC and Compatible Computers", 2003, Prentice Hall, 4th edition, pp. 513-515.

Shigei, N., et al., "On Efficient Spare Arrangements and an Algorithm with Relocating Spares for Reconfiguring Processor Arrays," IEICE Transactions on Fundamentals of Electronics, communications and Computer Sciences, vol. E80-A, No. 6, Jun. 1997, pp. 988-995.

"Interference Management in Femto Cell Deployment", Mingxi Fan, Mehmet Yavuz, Sanjiv Nanda, Yeliz Tokgoz, Farhad Meshkati, Raul Dangui, Qualcomm Incorporated, QUALCOMM 3GPP2 Femto Workshop, Boston, MA, Oct. 15, 2007.

"Details on specification aspects for UL ICIC", Qualcomm Europe, May 5-May 9, 2008, 2 pages.

3GPP TS 36.331 v9.2.0 3RD Generation Partnership Project: Technical Specification Group Radio Access Network; Evolved Universal Terrestrial Radio Acces (E-UTRA); Radio Resource Control (RRC) Protocol specification (Release 9) Mar. 2010, pp. 1-248.

Alcatel-Lucent, et al., "Congested H(e)NB Hybrid Access Mode cell", 2009, 3GPP Draft; R3-091053-Congested H(e)NB, $3^{RD}$ Generation Partnership Project (3GPP), Apr. 29, 2009, 4 pages.

Motorola, "Text proposal for TR 36.9xx: Reducing HeNB interference by dynamically changing HeNB access mode", 2009, 3GPP Draft: R4-094688, Apr. 29, 2009, 2 pages.

MIPS, MIPS32 Architecture for Programmers, 2001, MIPS Technologies, vol. 2, pp. 1-253.

Pechanek, et al. ManArray Processor Interconnection Network: An Introduction, Euro-Par'99, LNCS 1685, pp. 761-765, 1999.

Waddington, T., Decompilation of "hello world" on Pentium and SPARC, 4 pages, [retrieved on Aug. 3, 2012]. Retrieved from the Internet:<URL: http://web.archive.org/web/20050311141936/http://boomerang.sourceforge.net/helloworld.html>.

Balakrishnan, et al., CodeSurfer/x86—A Platform for Analyzing x86 Executables, Springer-Verlag Berlin Heidelber, 2005, [retrieved on Dec. 30, 2011], retrieved from the internet:<URL:http://www.springerlink.com/content/uneu2a95u9nvb20v/>.

Miecznikowski, J., et al., "Decompiling Java Using Stage Encapsulation", Proceedings of the Eighth Working Conference on Reverse Engineering, Oct. 2-5, 2001.

* cited by examiner

FEMTOCELL BASE STATION

1. PRIORITY CLAIM

This application is a continuation of and claims priority to and the benefit of PCT Application No. PCT/EP/2010/064794 filed on Oct. 5, 2010 which claims priority to and the benefit of Great Britain Application No. 0917370.9 filed on Oct. 5, 2009.

2. FIELD OF THE INVENTION

The invention relates to femtocell base stations for use in communication networks, and in particular to a method of controlling a maximum permitted transmission power for downlink transmissions from femtocell base stations, and a femtocell base station configured to perform the method.

3. RELATED ART

Femtocell base stations in a Long Term Evolution (LTE) communication network (otherwise known as Home evolved Node Bs—HeNBs—or Enterprise evolved Node Bs—EeNBs) are small, low-power, indoor cellular base stations for residential or business use. They provide better network coverage and capacity than that available in such environments from the overlying macrocellular LTE network. In addition, femtocell base stations use a broadband connection to receive data from and send data back to the operator's network (known as "backhaul").

Femtocell base stations can operate in one of three modes known as "Closed", "Open" or "Hybrid". For femtocell base stations operating in a "Closed" mode, only a limited set of mobile devices (otherwise known as User Equipment—UE) belonging to the Network Operator associated with the femtocell base station are allowed to access the femtocell base station. This set of UEs is called the Closed Subscriber Group (CSG), and would typically consist of family members where the femtocell base station is used in a home environment, or employees where the femtocell base station is used in an enterprise or work environment.

For femtocell base stations operating in an "Open" mode, all UEs belonging to the Network Operator are allowed to access the femtocell base station. This might be desirable in order to allow other UEs that would otherwise have a poor signal quality, or that would otherwise cause or suffer interference to/from the femtocell base station, to access the femtocell base station.

For femtocell base stations operating in a "Hybrid" mode, all UEs belonging to the Network Operator are allowed to access the femtocell base station as in the "Open" mode. However priority is given to UEs that are in the CSG set in order to avoid significant degradations in Quality of Service for these UEs that might result from UEs that are not in the CSG set consuming significant resources in the femtocell base station (these resources might include femtocell base station power, bandwidth (in LTE networks) or code resource (in WCDMA networks), and backhaul bandwidth). These non-CSG UEs are referred to as "visiting" UEs herein as they are temporarily making use of the resources of the femtocell base station.

A non-CSG UE may "visit" a femtocell base station that is operating in an open or hybrid mode either when the UE is in "active mode" (i.e. the UE is part of a telephone call or a data session) in which case the UE will hand-in to the femtocell base station, or when the UE is in "idle mode" (i.e. when no communications between the UE and the network are taking place) in which case the UE will "re-select" the femtocell base station (which means that the UE will start monitoring the control channels of the femtocell base station).

Handover and re-selection decisions are made on the basis of measurements of pathloss and/or signal quality and comparisons between the existing cell serving the UE and a potential new cell. In the case of a UE in active mode, measurement reports to the network may be triggered when certain conditions are met, for example a potential target cell is X decibels (dB) better than the current serving cell. Such a measurement is called a measurement event and may trigger a handover to the new cell. In the case of a UE in idle mode, reselection to a new cell is performed when certain conditions are met, for example a potential target cell is Y dB better than the current cell. The parameters used for the decisions (for example X and Y) are called handover/reselection parameters herein and are parameters broadcast from each cell in system information messages.

As femtocell base stations can make use of the same frequencies as macrocell base stations in the macrocellular network, and as they are located within the coverage area of one or more macrocell base stations in the macrocellular network, it is necessary to ensure that downlink transmissions from the femtocell base station to UEs using the femtocell base station do not interfere substantially with downlink transmissions from macrocell base stations to UEs using the macrocell base stations.

Typically, this interference is mitigated by placing a cap on the power that the femtocell base station can use to transmit signals to UEs. The setting of the downlink power from the femtocell base station is an important step in the configuration of femtocell base stations since consideration needs to be made of the desired coverage of the femtocell base station, interference to other non-served UEs (i.e. UEs connected to a neighboring or overlying macrocell base station), and in the case of femtocell base stations operating in "open" or "hybrid" modes, the likelihood of non-CSG UEs "visiting" the femtocell and making use of the femtocell base station.

Currently, during initialization of the femtocell base station, the maximum permitted transmit power is set to an initial value. This initial value will typically be based upon measurements made of macrocell base stations and other femtocell base stations in the vicinity of the femtocell base station. The measurements will be made making use of so called "sniffer" functionality in the femtocell base station itself, where the sniffer functionality measures the power and reads system information from the downlink transmissions of the neighboring macrocell and femtocell base stations. The downlink transmission power is then set as a compromise between achieving the desired coverage for the femtocell base station and minimising the interference to nearby non-served UEs (which are referred to as "victim" UEs herein).

While this initialization provides an initial estimate of the appropriate downlink power for the femtocell base station, the propagation conditions between a neighboring macrocell base station or femtocell base station and their associated UEs may differ significantly from the propagation conditions between a neighboring macrocell base station or femtocell base station and the femtocell base station as measured during sniffing. Furthermore the propagation conditions between the femtocell base station and nearby non-served UEs will not be known. These differences may result in uncertainty when estimating the impact of interference from the femtocell base station downlink to non-served UEs. Specifically, any estimate of the signal to noise and interference ratio (SNIR) will be subject to error which in practice will mean that the femtocell base station downlink power will need to be set conservatively which could adversely impact the coverage and throughput of the femtocell.

Two solutions have been proposed to overcome this problem. The first requires the UEs being served by the femtocell base station ("served UEs" below) to make measurements of the transmissions by neighboring macrocell base stations and femtocell base stations and to report these back to the femtocell base station. This can help build up a better picture of the likely pathloss between neighboring macrocell base stations and femtocell base stations and non-served victim UEs. However, since the physical location of the served UEs is likely to be different to that of the non-served victim UEs, this is still prone to error.

The second solution requires non-served victim UEs that are being served by a macrocell base station to measure the interfering signals from the femtocell base station as well as the signals from its own serving macrocell base station, and to report the measurements back through the macro system network. This information can then be forwarded to the femtocell base station via the network infrastructure. However, the drawbacks of this approach are that it requires significant changes to the macro network functionality and that there is potentially ambiguity in identifying a femtocell base station—for example in 3G WCDMA networks there is ambiguity regarding the identity of the measured femtocell base station, since the scrambling code does not uniquely define the identity of a femtocell base station. Similarly, for LTE networks there is an ambiguity in the Physical Cell Identity.

Therefore, there is a need for an improved approach for setting the maximum permitted transmission power for downlink transmissions from femtocell base stations.

SUMMARY

Therefore, according to a first aspect of the invention, there is provided a method of operating a femtocell base station comprising following a hand-in or reselection of the femtocell base station by a mobile device, determining a reason for the hand-in or reselection by the mobile device and adjusting a maximum permitted transmission power of the femtocell base station according to the determined reason.

According to a second aspect of the invention, there is provided a femtocell base station for use in a communication network comprising a processor that is configured to determine a reason for hand-in or reselection of the femtocell base station by a mobile device and to adjust a maximum permitted transmission power of the femtocell base station according to the determined reason.

According to a third aspect of the invention, there is provided a computer program product comprising computer program code embodied therein, the computer program code being configured such that, upon execution by a processor or computer following hand-in or reselection of a femtocell base station by a mobile device, the processor or computer determines a reason for the hand-in or reselection by the mobile device and adjusts a maximum permitted transmission power of the femtocell base station according to the determined reason.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views. The invention will now be described in detail, by way of example only, with reference to the following drawings, in which.

DETAILED DESCRIPTION

Although the invention will be described below with reference to an LTE communication network and femtocell base stations or HeNBs, it will be appreciated that the invention is applicable to other types of third or subsequent generation network in which femtocell base stations (whether for home, business or public use), or their equivalents in those networks, can be deployed. Moreover, although in the embodiments below the femtocell base stations and macrocell base stations use the same air interface (LTE), it will be appreciated that the invention can be used in a situation in which the macrocell and femtocell base stations use the same or corresponding frequencies but different air interface schemes (for example the macrocell base stations could use WCDMA while the femtocell base stations use LTE).

Figure 1:
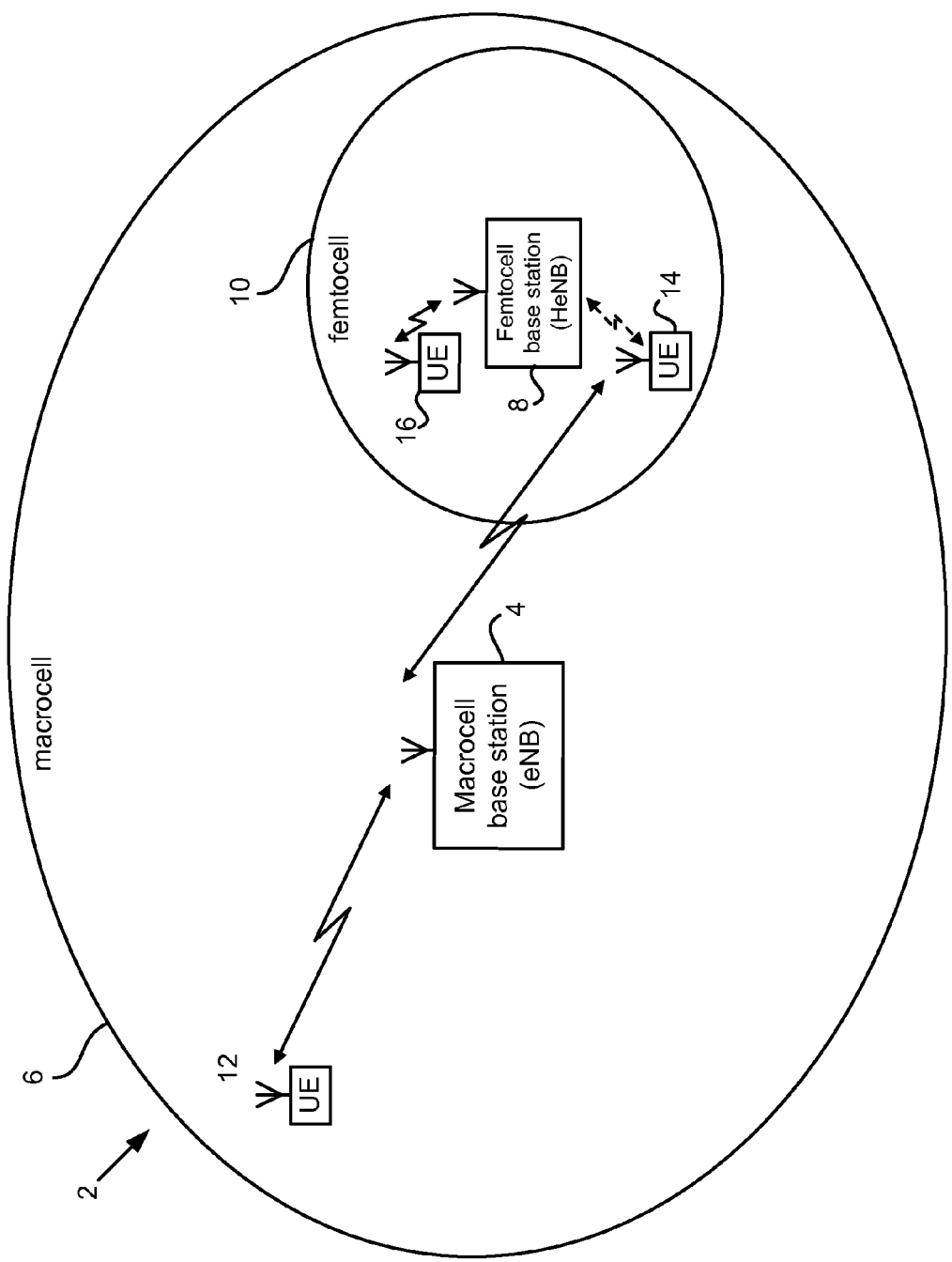
FIG. 1 shows an exemplary communication network.

FIG. 1 shows part of an exemplary communication network 2 in which the invention can be implemented. The communication network 2 includes a plurality of macrocell base stations 4 (only one of which is shown in FIG. 1) that each define a respective coverage area—indicated by macrocell 6. In an LTE communication network, the macrocell base stations 4 are referred to as evolved Node Bs (eNBs).

One or more femtocell base stations 8 (Home eNBs—HeNBs) can be located within the coverage area 6 of the macrocell base station 4 (although only one femtocell base station 8 is shown in FIG. 1), with each femtocell base station 8 defining a respective coverage area—indicated by femtocell 10.

It will be appreciated that FIG. 1 has not been drawn to scale, and that in most real-world implementations the coverage area 10 of the femtocell base station 8 will be significantly smaller than the coverage area 6 of the macrocell base station 4.

A number of mobile devices (UEs) 12, 14 and 16 are also located in the communication network 2 within the coverage area 6 of the macrocell base station 4.

Mobile devices 12 and 14 are each associated with the macrocell base station 4, meaning that they transmit and/or receive control signaling and/or data using the macrocell base station 4. It will be noted that although the mobile device 14 is also within the coverage area 10 of the femtocell base station 8, the mobile device 14 is associated with the macrocell base station 4 (perhaps because the signal strength of the macrocell base station 4 is better for mobile device 14 than the signal strength of the femtocell base station 8 or the femtocell base station 8 could be restricted to specific subscribers that don't include mobile device 14, etc.).

The third mobile device 16 is also located within the coverage area 10 of the femtocell base station 8 and is associated with the femtocell base station 8, meaning that it transmits and/or receives control signaling and/or data using the femtocell base station 8.

Figure 2:
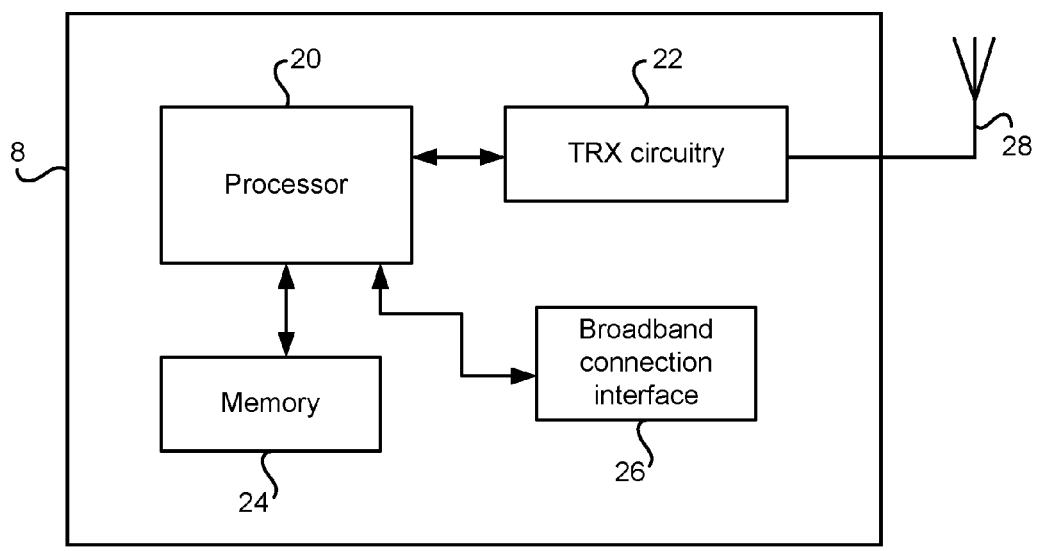
FIG. 2 is a block diagram of a femtocell base station in accordance with the invention.

The femtocell base station 8 is illustrated in more detail in FIG. 2. The femtocell base station 8 comprises a processor 20 that controls the operation of the femtocell base station 8, transceiver circuitry 22, a memory 24 and a broadband connection interface 26 each connected to the processor 20, and an antenna 28 connected to the transceiver circuitry 22.

As described above, it is necessary to ensure that the downlink transmissions from the femtocell base station 8 to UE 16 do not prevent nearby UEs 12 or 14 from being able to successfully receive downlink transmissions from the macrocell base station 4. A similar requirement exists for a mobile device that is associated with another femtocell base station, in that the downlink transmissions from the femtocell base station 8 to UE 16 should not prevent those mobile devices from successfully receiving the downlink transmissions from their femtocell base station.

Also as described above, this problem is addressed in conventional networks by applying a cap to the transmission power used by femtocell base stations 8 to transmit signals to its associated UEs. This cap is set to a value that prevents these downlink signals from causing an undesirable level of interference to mobile devices that are not associated with the femtocell base station 8 that are in or near the coverage area 10 of the femtocell base station 8 (such as mobile device 14 in FIG. 1).

In the following explanation of the invention, UE 14, which is currently associated with the macrocell base station 4, switches to being served by the femtocell base station 8. The UE 14 can either "hand in" to the femtocell base station 8 while the UE 14 is in active mode (i.e. the UE is in a voice or data call) or the UE 14 can reselect the femtocell base station 8 while it is in idle mode (i.e. the UE is not in a voice or data call). This hand-in or reselection to the femtocell base station 8 is represented by dashed arrow 18.

In accordance with one aspect of the invention, on hand-in or reselection of a new base station, the UE 14 stores an "event history" in an internal memory that contains information on the network conditions for UE 14. The "event history" can comprise either: the signal power (for example the Reference Signal Received Power, RSRP, in LTE) and/or signal quality (for example the Reference Signal Received Quality, RSRQ, in LTE) for both the source cell (i.e. the macrocell 6 that was serving the UE 14 before the hand-in or reselection) and the target cell (i.e. the femtocell 10); or a measurement event that has recently been sent to the source cell (i.e. the macrocell 6 that was previously serving the UE 14 before the hand-in or reselection).

The relevant measurement events defined in 3GPP specification 36.331 include:
Event A2: Serving becomes worse than absolute threshold;
Event A3: Neighbor becomes amount of offset better than serving;
Event A4: Neighbor becomes better than absolute threshold;
Event A5: Serving becomes worse than absolute threshold1 AND Neighbor becomes better than another absolute threshold2.

In the above events, "Serving" represents the cell serving the UE 14 prior to the hand-in or reselection (i.e. macrocell 6) and "Neighbor" refers to the cell that the UE hands-in to or reselects (i.e. the femtocell 10).

The decision on whether the UE 14 should be configured to store the RSRP and/or the RSRQ can be made using Radio Resource Management (RRM) and an Operations and Maintenance (OAM) subsystem in the macrocellular network, and the decision can be conveyed to the UE 14 by means of Radio Resource Control (RRC) signaling as defined in 3 GPP specification 36.331.

Where the UE 14 is configured to measure the RSRP and/or RSRQ of the source cell 6 and target cell 10, the stored event history can also comprise a parameter "s-Measure" which determines the RSRP threshold on the serving cell below which measurements are made.

In accordance with the invention, the UE 14 provides the event history information to the femtocell base station 8 when it hands-in or reselects the femtocell base station 8, the femtocell base station 8 uses the event history to determine the reason for the UE 14 switching to the femtocell base station 8 and then sets its maximum permitted transmission power for its downlink transmissions accordingly.

This will be explained in more detail with reference to FIG. 3. In this embodiment of the invention, the femtocell base station 8 is operating in an open or hybrid mode and the UE 14 is not in a closed subscriber group (CSG) of the femtocell base station 8.

In step 101, the femtocell base station 8 receives event history information from UE 14 that has handed-in to the femtocell base station 8 or reselected the femtocell base station 8 as its serving cell. If UE 14 has handed-in to the femtocell base station 8, the event history information can be transferred to the femtocell base station 8 when the hand-in takes place. However, if UE 14 has reselected the femtocell base station 8 as its serving cell, the event history information can be transferred to the femtocell base station 8 when UE 14 switches to an active mode.

In step 103, the femtocell base station 8 uses the received event history to determine the reason for UE 14 handing-in or reselecting the femtocell base station 8. As UE 14 is a non-CSG UE for the femtocell base station 8, it will have handed-in or reselected femtocell base station 8 due to either (a) a poor signal level or quality in the (source) macrocell 6; or (b) high levels of interference in the macrocell 6 from the downlink transmissions of the femtocell base station 8. Step 103 is explained in more detail with reference to FIG. 5 below.

If it is determined that (a) applies (i.e. the signal level or quality in the macrocell 6 is poor), then the femtocell base station 8 can maintain its maximum permitted downlink transmission power at the current level (steps 105 and 107). The femtocell base station 8 can also continue to operate in an open or hybrid mode (i.e. priorities for non-CSG UEs can be maintained)

Optionally (as indicated by dashed step 109 in FIG. 3), if the signal level or quality in the macrocell 6 is particularly poor (i.e. below a specified threshold), the femtocell base station 8 could make itself more "open" by increasing its maximum permitted downlink transmission power and/or increasing priorities for non-CSG UEs. In this way, the femtocell base station 8 can help to improve the network coverage in the macrocell 6.

If, at step 103, it is determined that (b) applies (i.e. there are high levels of interference in the macrocell 6 from the downlink transmissions of the femtocell base station 8), then the femtocell base station 8 can reduce its maximum permitted transmission power (steps 105 and 111). In some embodiments, the femtocell base station 8 can alter its maximum permitted transmission power in steps of 1 to 5 dB.

Therefore, the femtocell base station 8 is able to make use of handover and reselection events to adjust its maximum downlink transmission power to avoid causing substantial interference in any overlying macrocells or neighboring femtocells.

Figure 4:
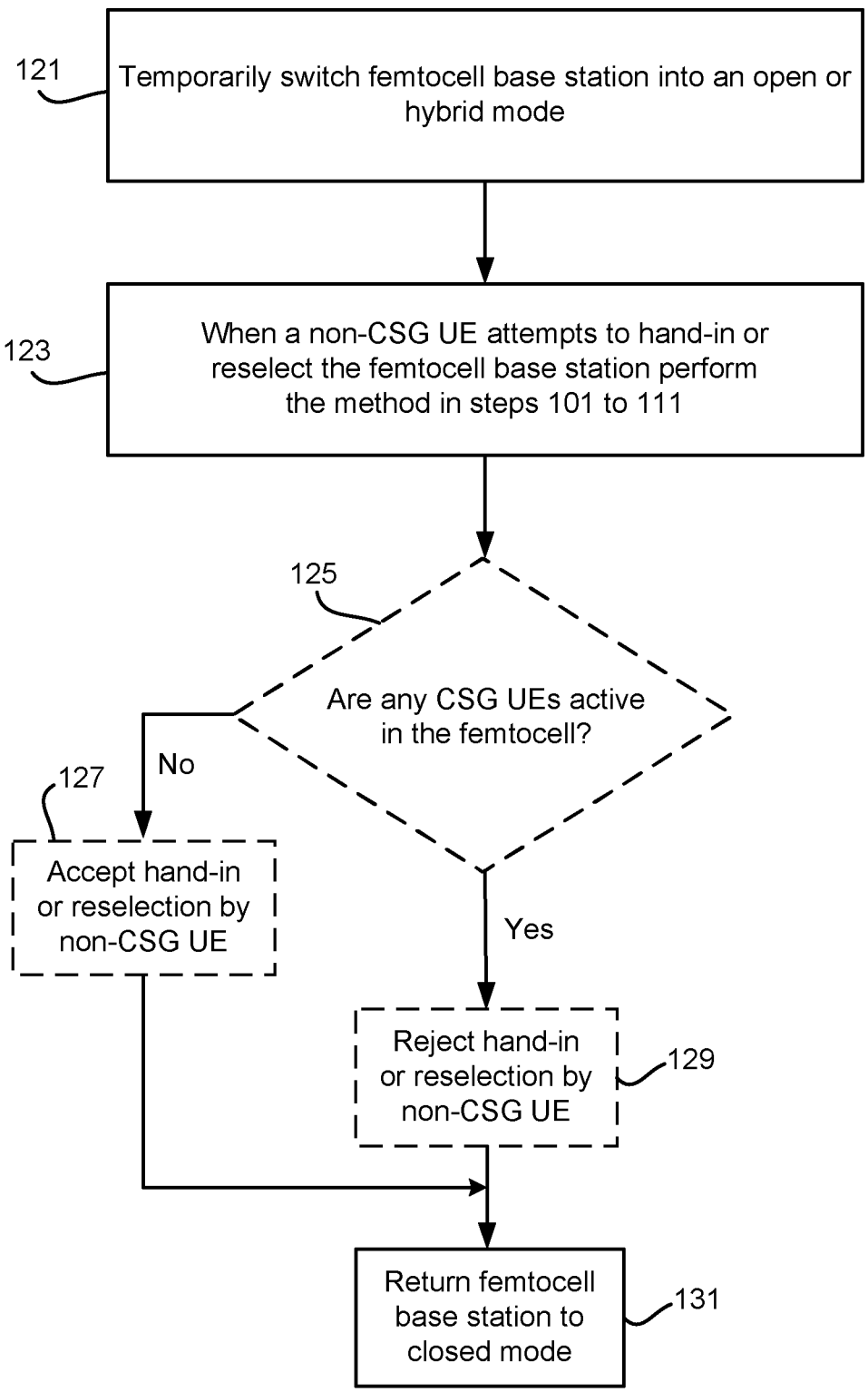
FIG. 4 is a flow chart illustrating a method of operating a femtocell base station that is in a closed mode of operation in accordance with the invention.

FIG. 4 illustrates a method in a femtocell base station 8 that is operating in a closed mode. It will be appreciated that non-CSG UEs will not be able to access the femtocell base station 8 in this mode, so no hand-in or reselection events will occur.

Therefore, the femtocell base station 8 can be temporarily switched into an open or hybrid mode of operation (step 121).

Figure 3:
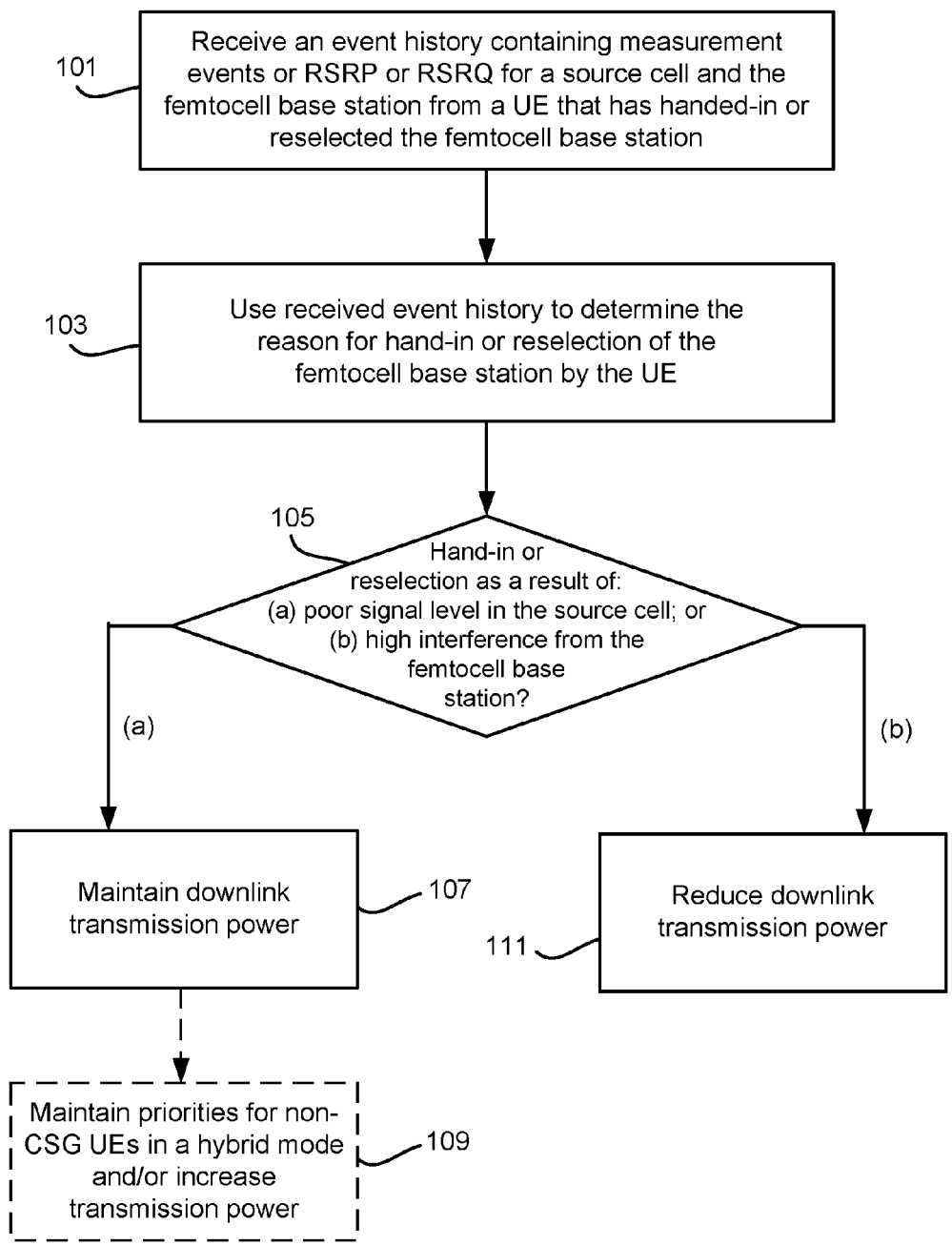
FIG. 3 is a flow chart illustrating a method of operating a femtocell base station that is in an open or hybrid mode of operation in accordance with the invention.

When a non-CSG UE (such as UE 14) attempts to hand-in to or reselect femtocell base station 8, steps 101-111 of FIG. 3 are performed by the femtocell base station 8 (step 123 of FIG. 4).

If it is determined that reason (a) applies, the femtocell base station 8 can maintain its maximum permitted transmission power at the current level, as described above. As the femtocell base station 8 is only temporarily in an open or hybrid mode of operation, there is no need to perform step 109. If it is determined that reason (b) applies, the femtocell base station 8 reduces its maximum permitted transmission power as described above.

Once the reason for the reselection or hand-in has been identified and the maximum permitted transmission power adjusted accordingly, the femtocell base station 8 can return to a closed mode of operation (step 131).

Optionally, the method in FIG. 4 could be performed only when there are no active UEs in the femtocell 10. In this way, the effect on the air interface and backhaul resources of the femtocell base station 8 would be limited.

Alternatively, after performing step 123, the femtocell base station 8 can determine if there are any active CSG UEs in the femtocell 10. If no CSG UEs active in the femtocell 10, the femtocell base station 8 can accept the hand-in or reselection by the non-CSG UE 14 (step 127). If there are one or more CSG UEs active in the femtocell 10, the femtocell base station 8 rejects the hand-in or reselection by the non-CSG UE 14 (step 129). After either accepting or rejecting the hand-in or reselection by the non-CSG UE 14, the femtocell base station 8 returns to operating in the closed mode.

In some embodiments of the invention, after switching into the open or hybrid mode in step 121, the femtocell base station 8 can remain in that mode until a hand-in or reselection event occurs, or until a specified number of hand-in or reselection events occur.

The method in FIG. 4 can be performed with any desired frequency. For example, the femtocell base station 8 can be switched into the open or hybrid mode one per day, once per hour, etc.

In any of the embodiments described above, the decision in step 107, 109 or 111 to maintain, increase or decrease the maximum permitted transmission power respectively can be made based on the analysis of a number of hand-ins or reselections.

If, while the femtocell base station 8 is in the open or hybrid mode (whether temporarily in accordance with the method in FIG. 4 or normally), a CSG UE hands-in or reselects the femtocell base station 8, then the femtocell base station 8 can treat the received event history differently to that received from a non-CSG UE. In particular, as the CSG UEs are likely to have a different spatial distribution to the non-CSG UEs (i.e. the CSG UEs might be in or entering the same building as the femtocell base station 8 and therefore benefit from a better RSRP and RSRQ from the femtocell 10), the femtocell base station should ignore event histories received from CSG UEs and not use them to adjust its maximum permitted transmission power.

Figure 5A:
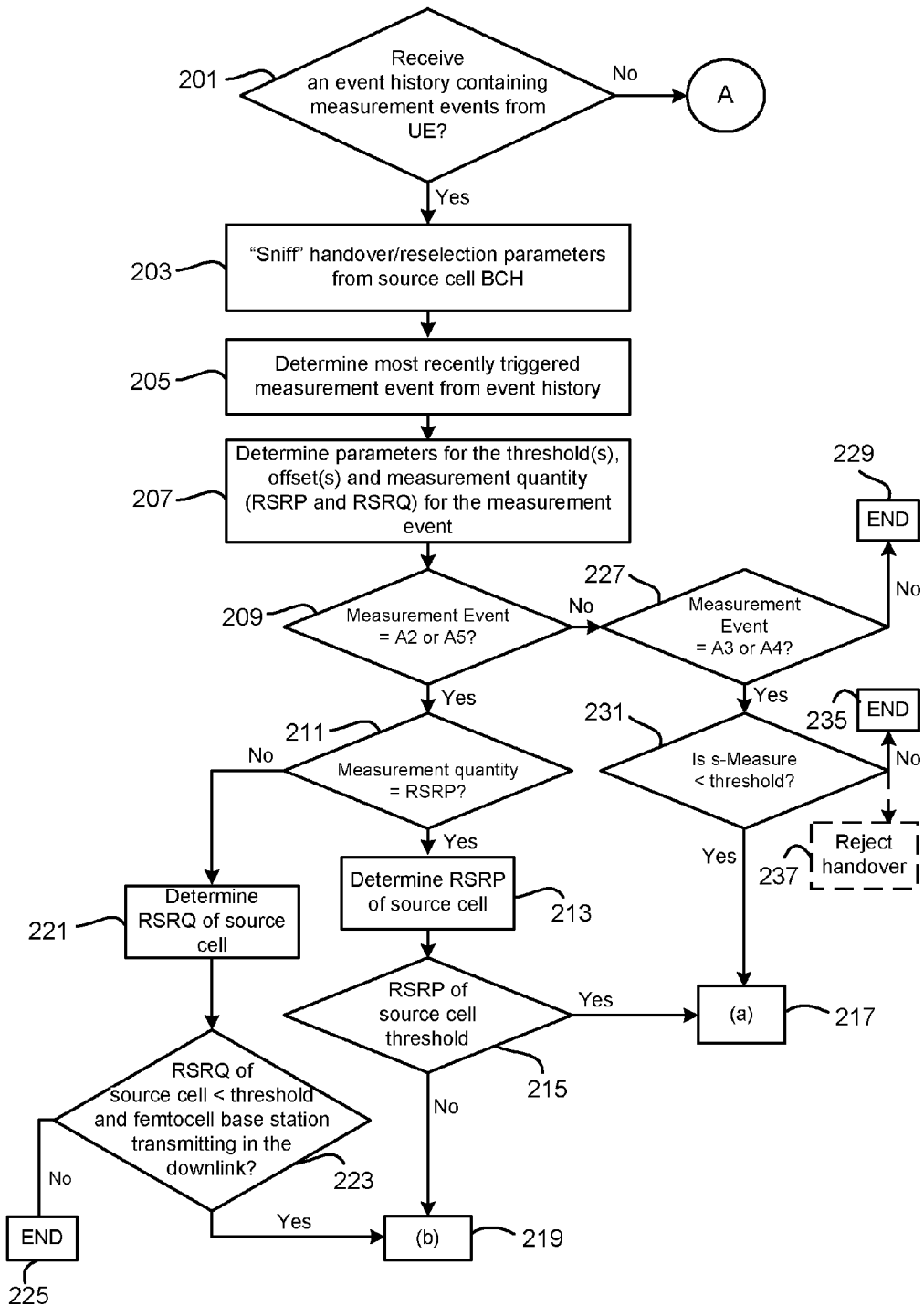
FIGS. 5A and 5B illustrate the process performed in steps 101-105 of FIG. 3 in more detail.
Figure 5B:
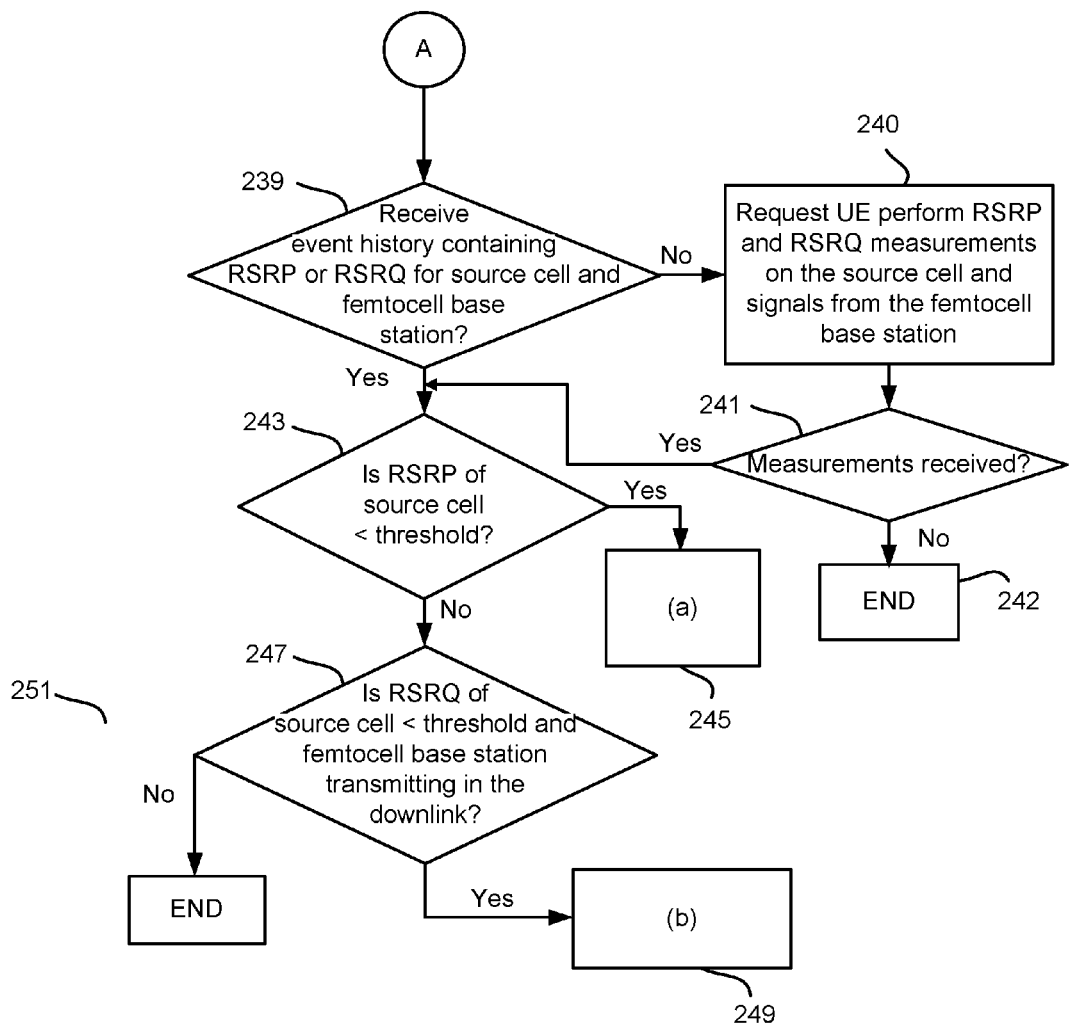

FIGS. 5A and 5B illustrate a process for determining the reason for UE 14 handing-in or reselecting the femtocell base station 8 from the received event history.

As described above, the event history may comprise either (i) the signal power RSRP or signal quality RSRQ for both the source macrocell 6 and the femtocell 10; or (ii) a measurement event that has recently been sent to the source macrocell 6. The way in which the femtocell base station 8 determines the reason for the hand-in or reselection depends on the particular information contained in the event history.

Therefore, in step 201 of FIG. 5A, it is determined whether the event history received from UE 14 contains a measurement event (for example any of A2 to A5 described above).

If the event history does contain a measurement event, the femtocell base station may obtain further information relating to the hand-in or reselection by reading (otherwise known as "sniffing") handover/reselection parameters from system information sent on the Broadcast Channel (BCH) of the source macrocell 6 (step 203). In this way the femtocell base station 8 can use the history of reported measurement events to determine the relative signal levels or relative signal qualities between the source macrocell 6 and femtocell 10.

Once the further information has been obtained in step 203, the femtocell base station 8 determines the most recently triggered measurement event (i.e. A2, A3, A4 or A5) by examining the received event history (step 205).

Then, in step 207, the femtocell base station 8 determines the associated parameters for the threshold(s), offset(s) and measurement quantity (RSRP or RSRQ) for the most recently triggered measurement event from the further information obtained in step 203.

Next, in step 209, it is determined whether the measurement event was A2 (Serving becomes worse than absolute threshold) or A5 (Serving becomes worse than absolute threshold) and neighbor becomes better than another absolute threshold2), and if so, it is determined whether the measurement quantity is the RSRP (step 211).

If the measurement quantity is the RSRP, the femtocell base station 8 determines the RSRP of the source macrocell 6 (step 213). In one embodiment, the femtocell base station 8 determines the RSRP of the source macrocell 6 by assuming it is equal to the threshold in Event A2 or threshold1 in Event A5.

The femtocell base station 8 determines if the RSRP of the source macrocell 6 is poor (i.e. less than another threshold) (step 215) and if so then it is determined that the UE 14 handed-in or reselected the femtocell base station 8 as a result of poor signal quality in the source macrocell 6 (step 217).

If, in step 215, the femtocell base station 8 determines that the RSRP of the source macrocell 6 is not poor, then it is determined that the UE 14 handed-in or reselected the femtocell base station 8 as a result of high interference from the femtocell base station 8 (step 219).

Returning now to step 211, if it is determined that the measurement quantity is not RSRP (i.e. it is RSRQ), the femtocell base station 8 determines the RSRQ of the source macrocell 6 (step 221). In one embodiment, the femtocell base station 8 determines the RSRQ of the source macrocell 6 by assuming it is equal to the threshold in Event A2 or threshold1 in Event A5.

The femtocell base station 8 then determines if the RSRQ of the source macrocell 6 is poor (i.e. less than another threshold) and whether the femtocell base station 8 was transmitting shortly before the hand-in or reselection took place (step 223), and if so, then it is determined that the UE 14 handed-in or reselected the femtocell base station 8 as a result of high interference from the femtocell base station (step 219).

If the RSRQ is not poor and/or the femtocell base station 8 was not transmitting shortly before the hand-in or reselection took place, then no relevant reason for the hand-in or reselection can be determined. Therefore, the process ends, the event history is discarded by the femtocell base station 8 and no adjustment to the maximum permitted transmission power of the femtocell base station 8 is made (step 225). Optionally, as the measurement event information has not been useful for identifying the reason for the hand-in or reselection at this stage, the femtocell base station 8 can request the UE 14 make measurements of the RSRP and RSRQ of the signals in the source macrocell 6 and the signals from the femtocell base station 8. The process can then proceed as described below for step 240 onwards.

Returning now to step 209, if it is determined that the measurement event in the received event history is not A2 or A5, the process moves to step 227 where it is determined whether the measurement event is A3 (Neighbor becomes amount of offset better than serving) or A4 (Neighbor becomes better than absolute threshold).

If the measurement event is not A3 or A4 then the process ends (step 229) as described above for step 225.

If the measurement event was A3 or A4, it is determined whether the value for s-Measure is below a threshold (step 231). If the value for s-Measure is below a threshold, then it is determined that the UE 14 handed-in or reselected the femtocell base station 8 as a result of poor signal quality in the source macrocell 6 (step 217).

If the value for s-Measure is above the threshold, then the process ends (step 235) as described above for step 225. Optionally, if the value for s-Measure is above the threshold and this process is carried out quickly enough, the femtocell base station 8 can reject the handover or reselection by UE 14. By rejecting the handover or reselection it is possible that another handover or reselection attempt will be made later with a different trigger measurement event.

Returning now to step 201, if the received event history does not contain measurement events from UE 14, the process moves to step 239 in FIG. 5B where it is determined whether the event history contains the RSRP or RSRQ for the source macrocell 6 and the femtocell 10. If the event history does not contain this information, the process moves to step 240 where the femtocell base station 8 requests the UE 14 make measurements of the RSRP and RSRQ of the signals in the source macrocell 6 and the signals from the femtocell base station 8. If the event history does contain this information, the process moves to step 243.

If the UE 14 does not provide these measurements in response to the request in step 240, the process ends (step 241) as described above for step 225.

If the UE 14 does provide these measurements in response to the request in step 240 the process moves to step 243.

If the event history does contain the RSRP or RSRQ, the femtocell base station 8 determines if the RSRP of the source macrocell 6 is less than a threshold (step 243). If it is determined that the RSRP of the source macrocell 6 is less than the threshold (i.e. the RSRP in the source macrocell 6 is poor), then the UE 14 handed-in or reselected the femtocell base station 8 as a result of poor signal quality in the source macrocell 6 (step 245).

If the RSRP of the source macrocell 6 is more than the threshold in step 243, then it is determined whether the RSRQ of the source macrocell 6 is less than a threshold and whether the femtocell base station 8 was transmitting shortly before the hand-in or reselection took place (step 247).

If the RSRQ of the source macrocell 6 is poor (i.e. less than the threshold) and the femtocell base station 8 was transmitting shortly before the hand-in or reselection took place, then it is determined that the UE 14 handed-in or reselected the femtocell base station 8 as a result of high interference from the femtocell base station (step 249).

If in step 247 the RSRQ is not poor and/or the femtocell base station 8 was not transmitting shortly before the hand-in or reselection took place, then no relevant reason for the hand-in or reselection can be determined. Therefore, the process ends (step 251) as described above for step 225.

In the aspect of the invention described above, UE 14 stores an event history containing information on the network conditions for UE 14 on hand-in or reselection of the new base station. However, in an alternative aspect of the invention, UEs do not store or report event histories, but instead, upon hand-in or reselection, the femtocell base station 8 requests the UE 14 make measurements of the RSRP and RSRQ of the signals in the source macrocell 6 and the signals from the femtocell base station 8 as in step 240 of FIG. 5B. The femtocell base station 8 then proceeds as set out in steps 243, 245, 247, 249 and 251 of FIG. 5B to determine the reason for the hand-in or reselection, and as set out in steps 105, 107, 109 and 111 of FIG. 3 to manage the maximum permitted transmission power.

There is therefore provided an improved approach for setting the maximum permitted transmission power for downlink transmissions from femtocell base stations.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method of operating a femtocell base station comprising:
following a hand-in or reselection of the femtocell base station by a mobile device, determining a reason for the hand-in or reselection by the mobile device; and
adjusting a maximum permitted transmission power of the femtocell base station following or in response to the hand-in or reselection according to the determined reason such that the reason for the adjusting of the maximum permitted transmission power is the reason for the hand-in or reselection.

2. A method as claimed in claim 1, wherein the step of determining a reason comprises determining whether the hand-in or reselection was as a result of poor signal levels in the cell serving the mobile device prior to the hand-in or reselection or high interference due to transmissions from the femtocell base station.

3. A method as claimed in claim 2, wherein in the event that it is determined that the hand-in or reselection occurred as a result of high interference due to transmissions from the femtocell base station, the step of adjusting comprises reducing the maximum permitted transmission power of the femtocell base station.

4. A method as claimed in claim 2, wherein in the event that it is determined that the hand-in or reselection occurred as a result of poor signal levels in the cell serving the mobile device prior to the hand-in or reselection, the step of adjusting comprises maintaining or increasing the maximum permitted transmission power of the femtocell base station.

5. A method as claimed in claim 1, wherein, following the hand-in or reselection of the femtocell base station and prior to the step of determining, the method further comprises the step of:
   receiving an event history from the mobile device, the event history comprising information on network conditions for the mobile device;
   wherein the step of determining comprises determining the reason for the hand-in or reselection by the mobile device from the received event history.

6. A method as claimed in claim 5, wherein the mobile device hands-in to the femtocell base station and the event history is received on hand-in of the mobile device to the femtocell base station.

7. A method as claimed in claim 5, wherein the mobile device reselects the femtocell base station and the event history is received when the mobile device first enters an active mode following reselection of the femtocell base station by the mobile device.

8. A method as claimed in claim 5, wherein the event history comprises a measurement event selected from:
   (i) Event A2: Serving becomes worse than a first absolute threshold;
   (ii) Event A3: Neighbor becomes an offset amount better than serving;
   (iii) Event A4: Neighbor becomes better than a second absolute threshold; and
   (iv) Event A5: Serving becomes worse than a third absolute threshold and Neighbor becomes better than a fourth absolute threshold; where Serving refers to the base station serving the mobile device prior to the hand-in or reselection and Neighbor refers to the femtocell base station.

9. A method as claimed in claim 8, wherein the step of determining comprises:
   identifying the measurement event contained in the event history;
   determining parameters for the threshold(s), offset and a signal power or signal quality as appropriate for the identified measurement event;
   determining that the hand-in or reselection was as a result of poor signal levels in the cell serving the mobile device prior to the hand-in or reselection if:
   (i) the identified measurement event is A2 or A5 and the signal power of said cell is below the first absolute threshold or third absolute threshold respectively; or
   (ii) the identified measurement event is A3 or A4 and a parameter determining the signal power below which measurements are made in said cell is below a threshold; and
   determining that the hand-in or reselection was as a result of high interference due to transmissions from the femtocell base station if:
   (i) the identified measurement event is A2 or A5 and the signal power of said cell is above the first absolute threshold or third absolute threshold respectively; or
   (ii) the identified measurement event is A2 or A5, the signal quality of said cell is below the first absolute threshold or third absolute threshold respectively and the femtocell base station was transmitting shortly before the hand-in or reselection by the mobile device.

10. A method as claimed in claim 6, wherein the event history comprises a signal power or signal quality for signals from the femtocell base station and signals in the cell serving the mobile device prior to the hand-in or reselection.

11. A method as claimed in claims 1, wherein, following the hand-in or reselection of the femtocell base station and prior to the step of determining, the method further comprises the step of:
   requesting measurements of a signal power and/or a signal quality for signals from the femtocell base station and signals in the cell serving the mobile device prior to the hand-in or reselection.

12. A method as claimed in claim 10, wherein the step of determining comprises:
   determining that the hand-in or reselection was as a result of poor signal levels in the cell serving the mobile device prior to the hand-in or reselection if the signal power of said cell is below a threshold; or
   determining that the hand-in or reselection was as a result of high interference due to transmissions from the femtocell base station if the signal power of said cell is above the threshold, the signal quality of said cell is below a second and the femtocell base station was transmitting shortly before the hand-in or reselection by the mobile device.

13. A method as claimed in claim 1, wherein the method is performed when the femtocell base station is configured to operate in an open or hybrid mode in which any mobile device may hand-in or reselect the femtocell base station.

14. A method of operating a femtocell base station, the femtocell base station being configured to operate in a closed mode in which only a predefined set of mobile devices can hand-in or reselect the femtocell base station, the method comprising:
   temporarily configuring the femtocell base station to operate in an open or hybrid mode in which any mobile device may hand-in or reselect the femtocell base station;
   following a hand-in or reselection of the femtocell base station by a mobile device, determining a reason for the hand-in or reselection by the mobile device; and
   adjusting a maximum permitted transmission power of the femtocell base station according to the determined reason wherein the mobile device handing-in or reselecting the femtocell base station is not a mobile device in the predefined set; and
   reconfiguring the femtocell base station to operate in the closed mode.

15. A femtocell base station for use in a communication network, the femtocell base station comprising:
- an antenna configured to transmit and receive signals;
- a memory configured to store machine readable code;
- a processor coupled to the memory and configured to, in response to a hand-in or reselection of the femtocell base station by a mobile device, execute the machine readable code to:
    - temporarily configuring the femtocell base station to operate in an open or hybrid mode in which any mobile device may hand-in or reselect the femtocell base station;
    - following a hand-in or reselection of the femtocell base station by a mobile device, determining a reason for the hand-in or reselection by the mobile device; and
    - adjusting a maximum permitted transmission power of the femtocell base station according to the determined reason wherein the mobile device handing-in or reselecting the femtocell base station is not a mobile device in the predefined set; and
    - reconfiguring the femtocell base station to operate in the closed mode.

16. A computer program product comprising a non-transitory computer readable medium, the computer program product performs the following steps:
- temporarily configuring the femtocell base station to operate in an open or hybrid mode in which any mobile device may hand-in or reselect the femtocell base station;
- following a hand-in or reselection of the femtocell base station by a mobile device, determining a reason for the hand-in or reselection by the mobile device; and
- adjusting a maximum permitted transmission power of the femtocell base station according to the determined reason wherein the mobile device handing-in or reselecting the femtocell base station is not a mobile device in the predefined set; and
- reconfiguring the femtocell base station to operate in the closed mode.

17. A femtocell base station as claimed in claim 15, wherein determining a reason includes determining whether the hand-in or reselection was as a result of poor signal levels in the cell serving the mobile device prior to the hand-in or reselection or high interference due to transmissions from the femtocell base station.

18. A femtocell base station as claimed in claim 17, wherein in the event that it is determined that the hand-in or reselection occurred as a result of high interference due to transmissions from the femtocell base station, the step of adjusting a maximum permitted transmission power includes reducing the maximum permitted transmission power of the femtocell base station.

* * * * *